(12) United States Patent
Hwang et al.

(10) Patent No.: US 6,970,618 B1
(45) Date of Patent: Nov. 29, 2005

(54) WAVELENGTH DIVISION MULTIPLEXER AND FIBER ARRANGEMENT THEREOF

(75) Inventors: Yu-Wen Hwang, Hsinchu Hsien (TW); Chung-Ping Chen, Taipei (TW); Chih-Wei Huang, Dali (TW)

(73) Assignee: Browave Corporation, Hsinchu (TW)

( * ) Notice: Subject to any disclaimer, the term of this patent is extended or adjusted under 35 U.S.C. 154(b) by 0 days.

(21) Appl. No.: 10/884,278

(22) Filed: Jul. 2, 2004

(30) Foreign Application Priority Data

Apr. 28, 2004 (TW) .............................. 93111818 A

(51) Int. Cl.⁷ .............................. G02B 6/28; G02B 6/35
(52) U.S. Cl. .............................. 385/24; 385/18; 385/47
(58) Field of Search .............................. 385/16–24, 33, 385/47

(56) References Cited

U.S. PATENT DOCUMENTS

| | | | |
|---|---|---|---|
| 6,400,862 B1 * | 6/2002 | Liu et al. ....................... | 385/24 |
| 6,535,668 B2 * | 3/2003 | Liu et al. ....................... | 385/33 |
| 2003/0206690 A1 * | 11/2003 | Hwang et al. ................. | 385/24 |

FOREIGN PATENT DOCUMENTS

EP          1158328 A2 *  11/2001  ............ G02B 6/34

* cited by examiner

Primary Examiner—Michelle R. Connelly-Cushwa

(57) ABSTRACT

A wavelength division multiplexer (WDM) and a type of fiber arrangement for the WDM are provided. In the WDM according to the invention, a filter having dielectric coating is used to allow lights within a specific band of wavelength to pass but reflect lights not within the specific band of wavelength. A reflection mirror is then used to reflect the lights passing through the filter to pass through the filter for a second time. Because of the two filtering, the WDM provided by the invention has very high adjacent channel isolation. In particular, the WDM contains a fiber pigtail having a fiber bundle and a ferrule with a square aperture in the center. By carefully arranging the common input fiber, the reflection output fiber, and the transmission output fiber inside the aperture, the lights in the specific band of wavelength have identical wavelength bandwidth when passing through the filter twice, and the insertion loss for both the transmission output and the reflection output is minimum. Having identical wavelength bandwidth implies that the wavelength bandwidth of lights emitted out of the transmission output is not reduced because the lights pass through the filter twice and cancel out each other. On the other hand, minimum insertion loss for both the reflection output and the transmission output implies that the performance of the WDM is optimal.

10 Claims, 10 Drawing Sheets

| fiber arrangement | $\triangle \alpha$ | $\triangle IL$ |
|---|---|---|
|  | 3.67° | 0.25dB |
|  | 1.34° | 0.10dB |
|  | 0° | 0.25dB |
|  | 0° | 0dB |

(A)

(B)

(C)

(D)

WAVELENGTH DIVISION MULTIPLEXER AND FIBER ARRANGEMENT THEREOF

FIELD OF THE INVENTION

The present invention generally relates to the wavelength division multiplexer, and more specifically to the reflection-type wavelength division multiplexer.

BACKGROUND OF THE INVENTION

FIG. 1(a) is a sectional view of a transmission-type wavelength division multiplexer (WDM) according to a prior art. As shown in FIG. 1(a), the WDM 11 contains a fiber pigtail 111, a GRaded-INdex (GRIN) lens 112, a filter 113, a second GRIN lens 119, and a second fiber pigtail 114, all adhered together with one another by an adhesive 118. A common input fiber 115 and a reflection output fiber 116 are extended from the fiber pigtail 111 and a transmission output fiber 117 is extended from the second fiber pigtail 114. In a typical operation of the WDM 11, a multi-wavelength light signal shoots into the WDM 11 via the common input fiber 115 and passes through the GRIN lens 112. The filter 113 is designed to allow only lights within a specific band of wavelength to pass but reflect lights outside the specific band of wavelength. Therefore, the lights within the specific band of wavelength pass through the filter 113 and are coupled to the transmission output fiber 117 via the GRIN lens 119. The reflected lights on the other hand are coupled to the reflection output fiber 116 via the GRIN lens 112. For this type of WDM 11, the input light signal passes through the filter 113 only once and has a moderate adjacent channel isolation about 30 dB.

FIG. 1(b) is a sectional view of a reflection-type WDM according to a prior art. As shown in FIG. 1(b), the WDM 12 contains a fiber pigtail 121, a cannular spacer 122, a GRIN lens 123, a filter 124, and a reflection mirror 125, all adhered together with one another by an adhesive 129. A common input fiber 126, a reflection output fiber 127, and a transmission output fiber 128 are extended from the fiber pigtail 121.

In a typical operation of the WDM 12, a multi-wavelength light signal shoots into the WDM 12 via the common input fiber 126 and passes through the GRIN lens 123. The filter 124 has a multi-layer dielectric interference coating which allows only lights within a specific band of wavelength to pass, but reflects lights outside the band of wavelength. The lights within the specific band of wavelength therefore pass through the filter 124 and are reflected by the reflection mirror 125 to pass through the filter 124 one more time. The GRIN lens 123 then focuses the lights to the transmission output fiber 128 of the fiber pigtail 121. The lights outside the specific band of wavelength are reflected by the filter 124 and focused by the GRIN lens 123 to the reflection output fiber 127 of the fiber pigtail 121.

For this type of WDM 12, lights are filtered twice by a single filter 124 to achieve significantly higher adjacent channel isolation. Moreover, as only a single GRIN lens 123 and a single fiber pigtail 121 are required, the WDM 12 has a much smaller form factor. However, it should be noted that the angle of incidence for lights entering into the filter 124 is inversely proportional to the transmitted wavelength of lights allowed to pass through the filter 124. More specifically, the larger the angle of incidence is, the shorter the transmitted wavelength gets, and the smaller the angle of incidence is, the longer the transmitted wavelength gets. Therefore, in real life application, the reflection-type WDM should be designed in a way that the lights will have identical angle of incidence when passing through the filter twice. In this way, the transmitted wavelength will not get shorter due to the lights' two passage through the filter and canceling out each other. In addition, another important design consideration for the reflection-type WDM is to have a structure that can minimize the insertion loss both at the transmission output and the reflection output. A smaller insertion loss implies that less amount of energy is lost during the lights' travel through the WDM.

SUMMARY OF THE INVENTION

Therefore, an objective of the present invention is to provide a reflection-type WDM that maintains identical wavelength bandwidth for lights passing through the filter twice, while minimizes the insertion loss both for the transmission output and the reflection output at the same time. Besides, there is a tilted angle between the reflection mirror and the filter in a reflection-type WDM according to a prior art and usually an adhesive is used to fix the reflection mirror and the filter at their positions. However, the positions and the angle between the reflection mirror and the filter would change as the adhesive expands or contracts when the temperature varies. This would cause the insertion loss to increase. The present invention will address this problem of prior arts as well.

The reflection-type WDM provided by the present invention contains a fiber pigtail, a cylindrical shaped convex lens (C-Lens), a cap for fixing the C-Lens, a filter having a multi-layer dielectric interference coating, a reflection mirror having a high reflective coating, a cannular spacer for fixing the relative positions of the C-Lens and the fiber pigtail, and a second cannular spacer tilted at an angle α for fixing the relative positions of the filter and the reflection mirror. All the afore-mentioned components are adhered together with an adhesive. The fiber pigtail further contains a ferrule having a tilted, cross-sectional end surface and a fiber bundle extending from the fiber pigtail and consisting of a common input fiber, a reflection output fiber, a transmission output fiber, and an idle fiber.

The ferrule has a square aperture. The four fibers are arranged in the aperture in a way so that, on the ferrule's tilted, cross-sectional end surface, the center point between the common input fiber core and the reflection output fiber core has identical distances to the common input fiber core and the transmission output fiber core. In addition, the line drawn between the transmission output fiber core and the reflection output fiber core is perpendicular to the line drawn between the center point and the highest point of the ferrule's tilted, cross-sectional end surface.

Such a fiber arrangement will achieve identical angle of incidence for lights entering the filter for the first and the second times. The wavelength bandwidth for the two passages of lights would therefore remain the same. A higher degree of adjacent channel isolation is also achieved.

Also to minimize the insertion loss both for the transmission output and the reflection output, there is a tilted angle between the reflection mirror and the filter. Traditionally an adhesive is used to fix the position of the reflection mirror and the filter. The adhesive however has a higher thermal expansion coefficient than that of the components of the WDM. As the temperature varies, the adhesive expands or contracts more easily than the components of the WDM and, therefore, causes the tilted angle of the reflection mirror to change. As a consequence, the originally optimal coupling of the reflection mirror and the filter is destroyed. To overcome the shortcoming of using adhesive, the present invention uses a tilted, cannular spacer made of a material having a low thermal expansion coefficient to fix the relative positions of the reflection mirror and the filter. The effect of temperature variation on the optimal coupling the components of the WDM is therefore reduced and the optical reliability of the WDM is improved significantly.

In applications, currently, the most economical and effective way to solve the bandwidth problem is to cascade the WDMs to build DWDM or OADM modules having a high adjacent channel isolation. With the present invention, the functionality and performance of the WDMs are enhanced significantly.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1A:
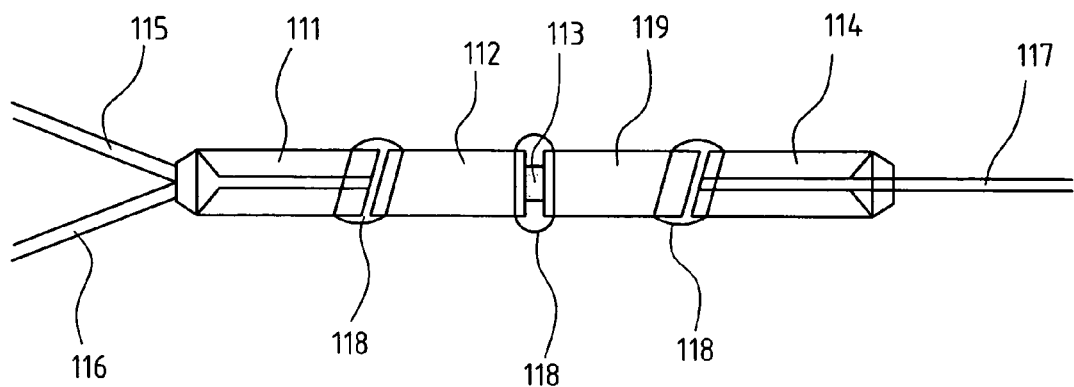
FIG. 1(a) is a sectional view of a transmission-type WDM according to a prior art.
Figure 1B:
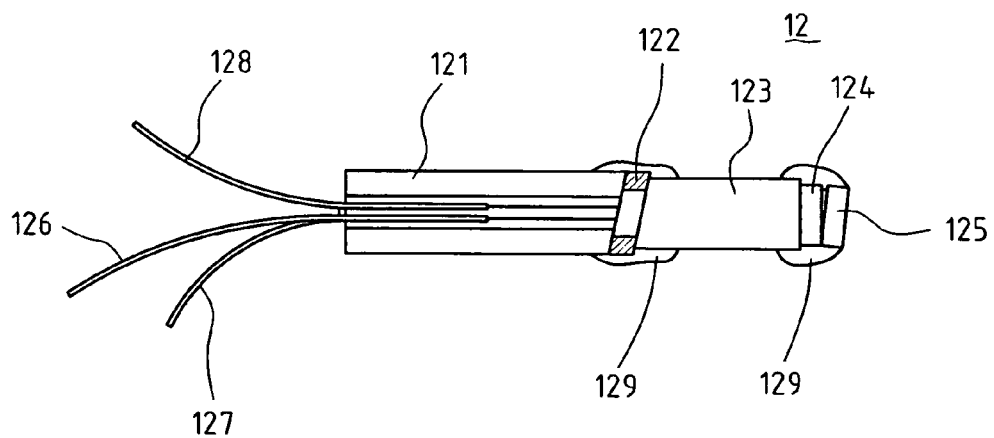
FIG. 1(b) is a sectional view of a reflection-type WDM according to a prior art.
Figure 2:
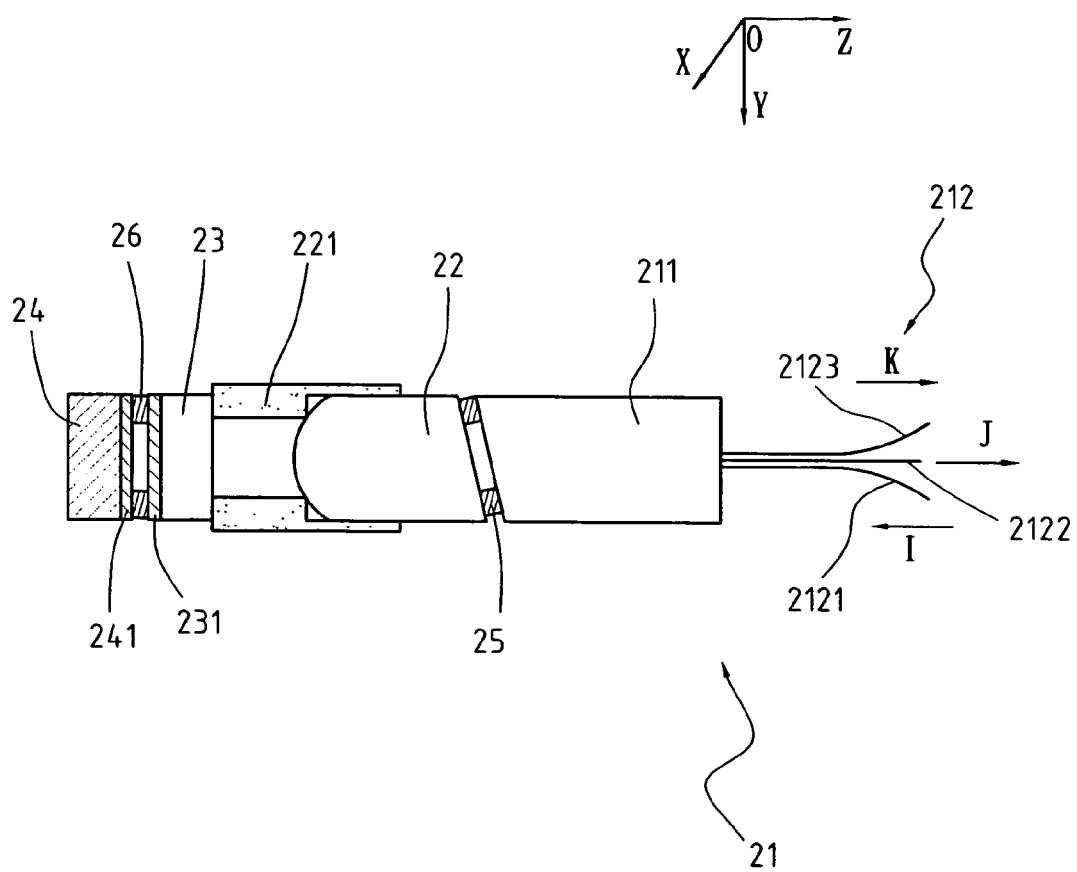
FIG. 2 is a sectional view of a reflection-type WDM according to the present invention.

FIG. 2 is a sectional view of a reflection-type WDM according to the present invention. As shown in FIG. 2, the WDM 2 contains a fiber pigtail 21, a cylindrical shaped convex lens (C-Lens) 22, a cap 221 for fixing the C-Lens 22, a filter 23 with a multi-layer dielectric interference coating 231, a reflection mirror 24 with a reflection coating 241, a cannular spacer 25 for fixing the relative positions of the fiber pigtail 21 and the C-Lens 22, a second cannular spacer 26 tilted with an angle α for fixing the relative positions of the filter 23 and the reflection mirror 24. The fiber pigtail 21 further contains a ferrule 211 and a fiber bundle 212 consisting of a common input fiber 2121, a reflection output fiber 2122, a transmission output fiber 2123, and an idle fiber 2124 (not shown in FIG. 2).

Other types of lenses having a focusing capability, such as the aspheric lens, can also be used as the afore-mentioned C-Lens.

All components of the WDM 2 are adhered together with one another by an adhesive 213 (not shown in FIG. 2). The two interfacing ends of the ferrule 211 and the C-Lens 22 both have an 8-degree tilted angle relative to the YOX plane. The objective of the 8-degree tilt is to avoid the interference to the input light signal when an incident light enters perpendicularly into the C-Lens 22 and a small amount of the incident light is reflected back to the common input fiber 2121 through the original incident path.

Figure 3:
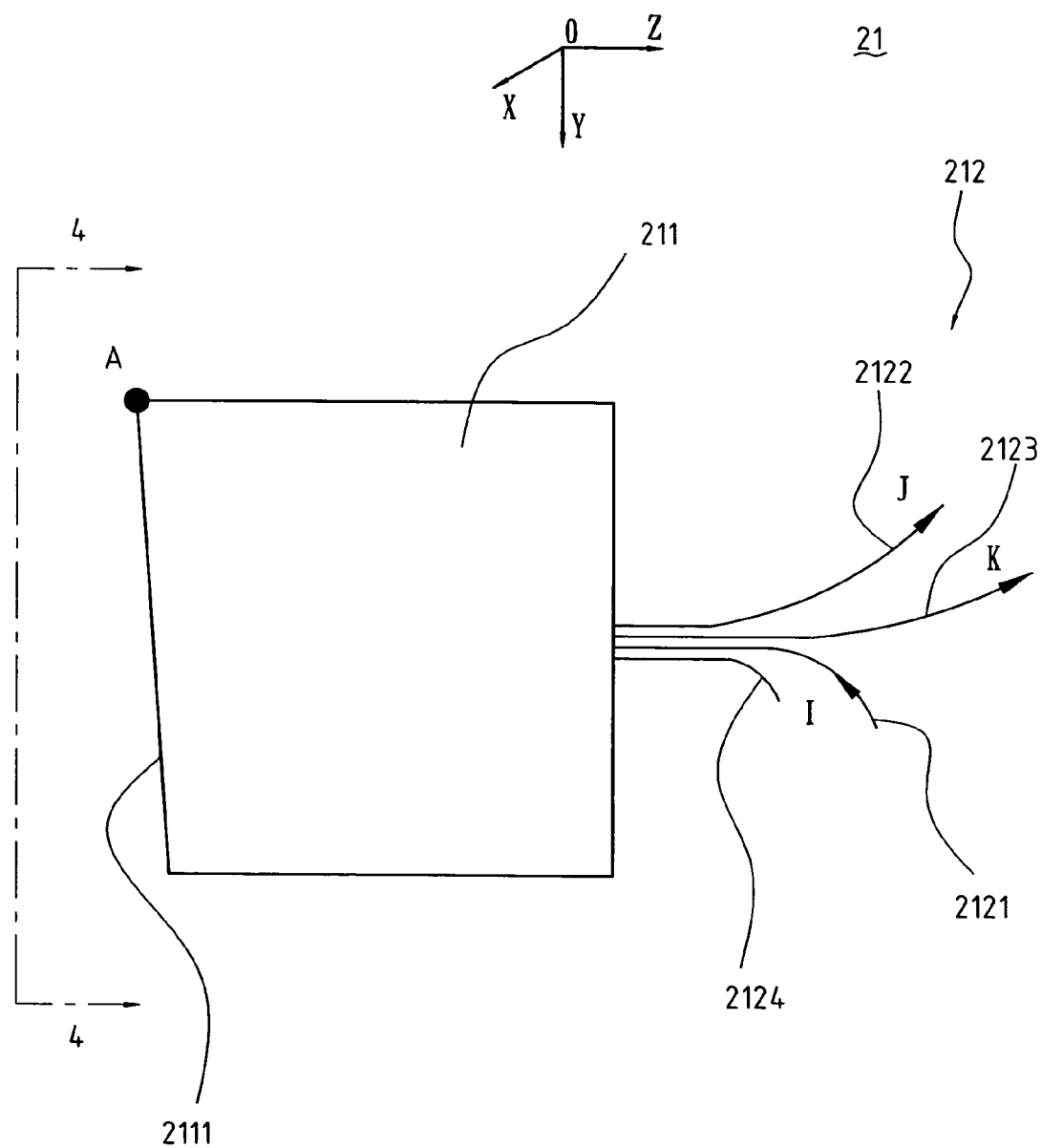
FIG. 3 is an enlarged section view of the fiber pigtail of a reflection-type WDM according to the present invention.
Figure 4:
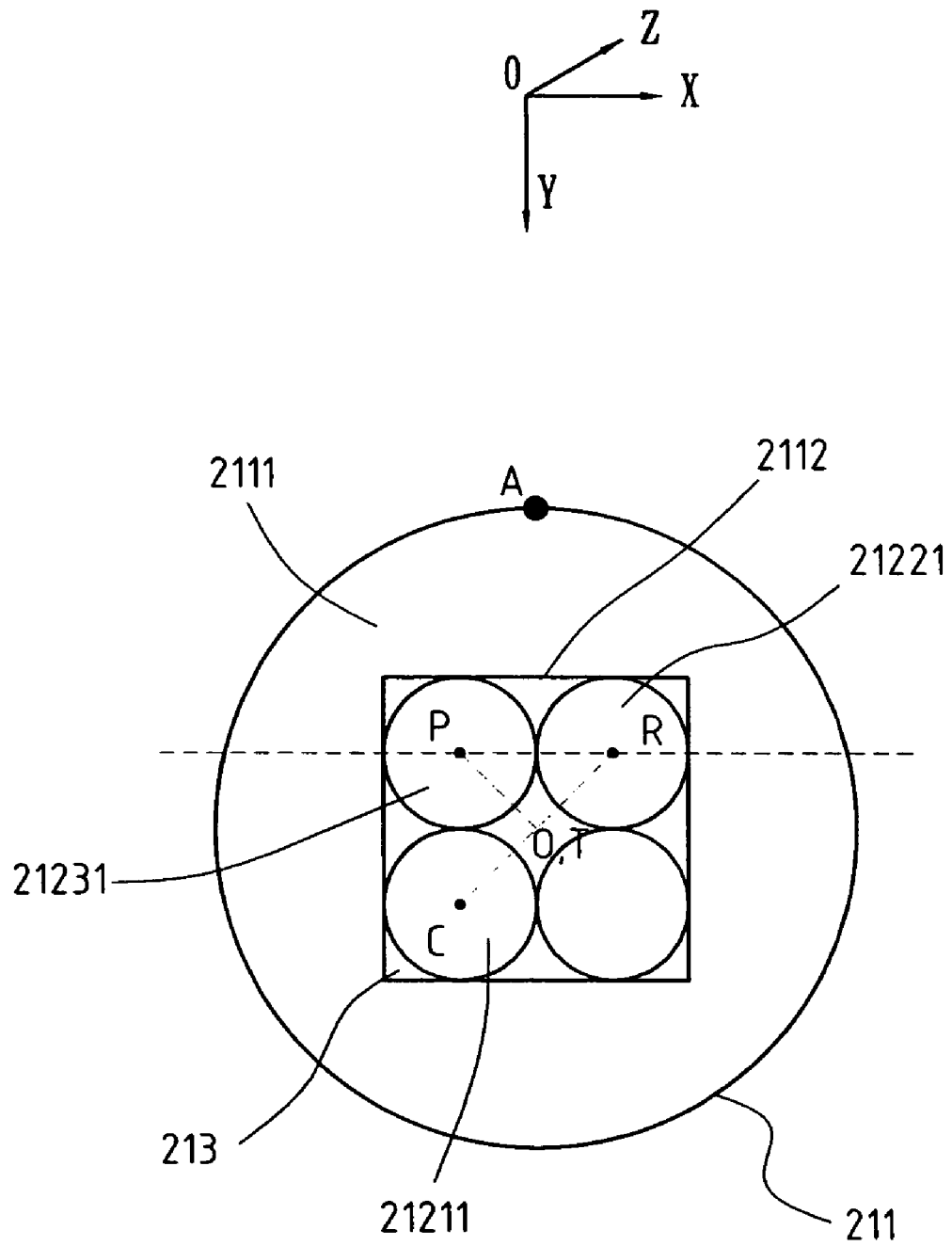
FIG. 4 shows the tilted, cross-sectional end surface of the fiber pigtail's ferrule of a reflection-type WDM according to the present invention.

In general, the fiber cladding of a single mode fiber has a diameter of 125 µm and the fiber core has a diameter of 8.3 µm. FIG. 3 is an enlarged section view of the fiber pigtail 21 of a reflection-type WDM according to the present invention. FIG. 4 shows the tilted, cross-sectional end surface of the ferrule 211 of the fiber pigtail 21. As shown in FIGS. 3 and 4, the fiber pigtail 21 has a ferrule 211 having an 8-degree tilted, cross-sectional end surface 2111 with a square aperture 2112 for accommodating the fiber bundle 212. The aperture 2112 can also have a different shape such as rectangle. The fiber bundle 212 consists of a common input fiber 2121, a reflection output fiber 2122, a transmission output fiber 2123, and an idle fiber 2124. The fiber bundle 212 enters the fiber pigtail 21 and has separate ends on the tilted, cross-sectional end surface 2111: the common input fiber end 21211, the reflection output fiber end 21221, and the transmission output fiber end 21231. Within the fiber ends, there are the common input fiber core C, the reflection output fiber core R, and the transmission output fiber core P. The fibers of the fiber bundle 212 are fixed within the square aperture 2112 of the ferrule 211 by the adhesive 213.

As the idle fiber 2124 is not used for the transmission and reception of light signal, its fiber outside the WDM 2 can be cut off.

In a typical operation of the WDM 2, a light signal I containing at least two wavelengths (for example, λ1, λ2, and λ3) enters the WDM via the common input fiber 2121 and emits out of fiber core C of the common input fiber end 21211. After passing through the C-Lens 22, the lights whose wavelengths (for example, λ2 and λ3) cannot pass the multi-layer dielectric interference coating 231 are reflected by the filter 23. The reflected lights are then focused by the C-Lens 22 on the fiber core R of the reflection output fiber end 21221, and guided out of the WDM 2 via the reflection output fiber 2122.

On the other hand, the lights whose wavelengths (for example, λ1) that can pass the multi-layer dielectric interference coating 231 reaches the reflection mirror 24 after passing through the filter 23. The reflection coating 241 of the reflection mirror 24 reflects the lights back to the filter 23. After a second filtering by the filter 23, the lights are focused on the fiber core P of the transmission output fiber end 21231 by the C-Lens 22 and then guided out of the WDM 2 via the transmission output fiber 2123.

Because of the lights are filtered twice, the adjacent channel isolation is at about 50 dB, which is much higher than that of a single-filtering WDM according to a prior art.

The four fibers are closely arranged and fixed at the four corners of the square aperture 2112 of the ferrule 211 by the adhesive 213. The fibers therefore have fixed distances and relative angles between them. As shown in FIG. 3, if the tip of the longest edge of the ferrule 211 and also the highest point of the tilted, cross-sectional end surface 2111 is defined as point A, point A is right above the square aperture 2112 as shown in FIG. 4. In this embodiment of the present invention, as shown in FIG. 4, the common input fiber core C is located at the lower left corner, the reflection output fiber core R is located at the upper right corner, the transmission output fiber core P is located at the upper left corner, and the idle fiber 2124 is located at the lower right corner of the square aperture 2112. In this arrangement, the transmission output fiber core P and the reflection output fiber core R are on a line perpendicular to the line drawn between the point A and the center point T of the ferrule 211. The lights in the reflection band J of wavelength (such as λ2, λ3) and the lights in the transmission band K of wavelength (such as λ1), after passing through the filter 23 and being reflected by the reflection mirror 24, are focused and converged by the C-Lens 22 on the square aperture 2112 of the ferrule 211. In order to achieve the optimal optical coupling for the transmission output fiber 2123 and the reflection output fiber 2122, the transmission output fiber core P and the reflection output fiber core R have to be located at the same distance behind the C-Lens 22 around the focus point of C-Lens 22. Therefore, if the transmission output fiber core P and the reflection output fiber core R are on a line perpendicular to the line connecting the point A and the center point T of the ferrule 211, the lights in the transmission band K and the reflection band J will travel the same distance in the C-Lens 22, and will be focused at the optimal position on the reflection output fiber end 21221 and transmission output fiber end 21231 respectively. The insertion loss will therefore be minimized.

In addition, for the lights in the transmission band K (such as λ1), their angle of incidence into the filter 23 for the first time should be identical to that into the filter 23 for the second time. This is because, if the angle of incidence is large, the transmitted wavelength would be shorter and, if the angle of incidence is small, the transmitted wavelength would be longer. Therefore, if the two angles of incidence are different, the lights would have a wavelength bandwidth too narrow to be useful after passing through the filter 23 two times.

Therefore, to achieve identical angles of incidence, the present invention arranges the common input fiber 2121, the reflection output fiber 2122, and the transmission output fiber 2123 in the ferrule's tilted, cross-sectional end surface 2111 as follows.

The center point between the common input fiber core C and the reflection output fiber core R is defined as point O. Then, the fibers has to be arranged so that the distance between the common input fiber core C and the point O is equal to the distance between the transmission output fiber core P and the point O. That is, the distance between CO should be the same as the distance between PO. Such type of fiber arrangement can achieve identical angle of incidence for the first and second passage through the filter 23 and the lights will not cancel out each other so that the wavelength bandwidth will remain the same.

Based on the foregoing description, to achieve identical wavelength bandwidth for the two passages through the filter 23 and minimum insertion loss for both the transmission output and the reflection output, the fibers have to be arranged as follows.

On the tilted, cross-sectional end surface 2111 of the fiber pigtail 21, the distances between the point O, defined as the center point of the common input fiber core C and the reflection output fiber core R, and the common input fiber core C and the transmission output fiber core P are identical. Also a line drawn between the transmission output fiber core P and the reflection output fiber core R is perpendicular to the line drawn between the ferrule's center point T and the point A, the highest point of the ferrule's tilted, cross-sectional end surface 2111.

Figure 5A:
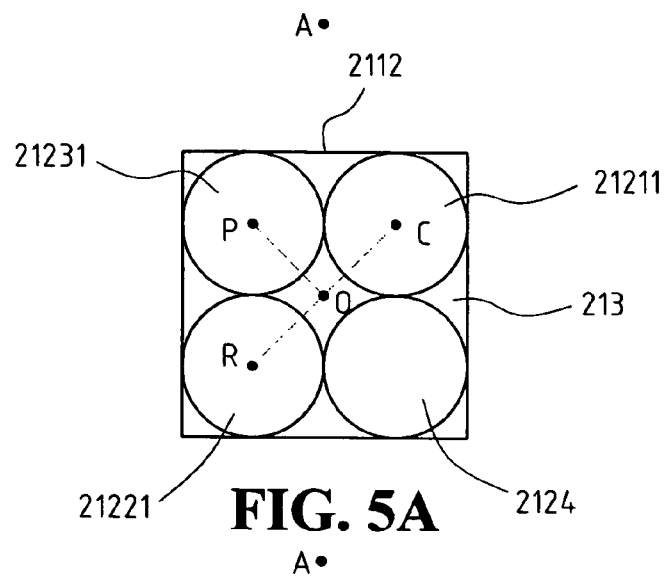
FIGS. 5(a) to 5(c) show various types of fiber arrangement within ferrule apertures of different shapes.
Figure 5B:
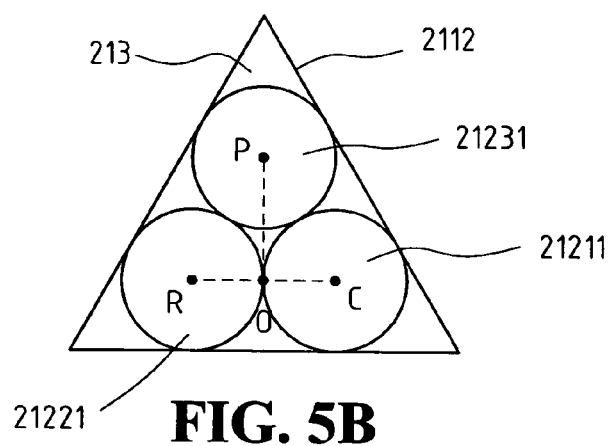
Figure 5C:
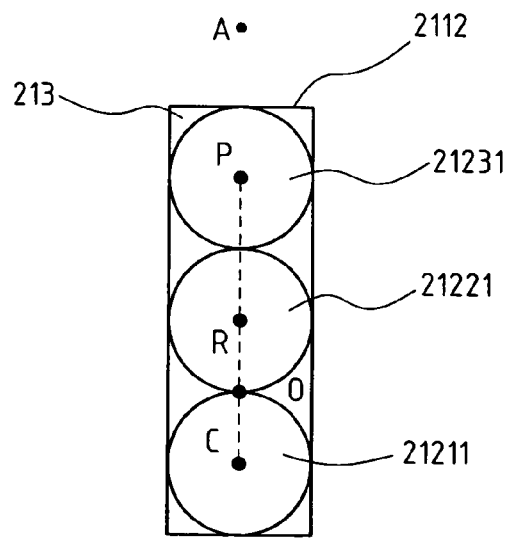

FIGS. 5(a) to 5(c) show various types of fiber arrangement within ferrule apertures of different shapes. Within FIGS. 5(a) to 5(c), the highest point of the ferrule's tilted, cross-sectional end surface 2111 is defined as the point A. As shown in FIG. 5(a), the four fibers are arranged in the aperture 2112 differently from what is shown in FIG. 4. With this arrangement, the distance CO is equal to the distance PO and, therefore, the angle of incidence for the first and second passage through the filter is identical. However, the line drawn between the transmission output fiber core P and the reflection output fiber core R is not perpendicular to the line drawn between the point A and the ferrule's center point T. This implies the lights within the reflection band J and transmission band K travel different distances within the C-Lens 22 and are focused on different locations relative to the reflection output fiber core R and the transmission output fiber core P. Because of these limitations, the fiber arrangement as shown in FIG. 5(a) cannot simultaneously achieve optimal optical coupling and minimum insertion loss for both the transmission output and the reflection output.

As shown in FIGS. 5(b) and 5(c), the aperture 2112 can accommodate three fibers and has a triangular and a vertical rectangular shape respectively. These two types of fiber arrangement share the same limitations when applied in the WDM 2. On one hand, the line drawn between the transmission output fiber core P and the reflection output fiber core R is not perpendicular to the line drawn between the point A and the ferrule's center point T. These two types of fiber arrangement therefore cannot simultaneously achieve optimal optical coupling and minimum insertion loss for both the transmission output and the reflection output. On the other hand, the distance CO is not equal to the distance PO. The angles of incidence for the lights in the transmission band K when passing through the filter for the first and second times are not identical. This would cause the problem of the wavelength bandwidth being too narrow. Therefore, none of the three types of fiber arrangement shown in FIGS. 5(a) to 5(c) is appropriate.

Figure 6:
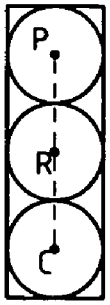
FIG. 6 is a comparison table showing Δα (the difference between the two angles of incidence for the two passages through the filter and ΔIL (the difference between the insertion loss achieved and the optimal insertion loss at the transmission output) for fiber arrangement according to the present invention as shown in FIG. 4 and other types of fiber arrangement as shown in FIG. 5(a) to 5(c).
Figure 6:
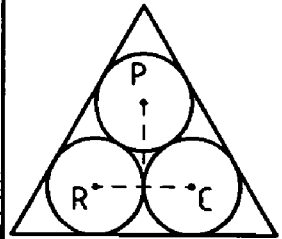
Figure 6:
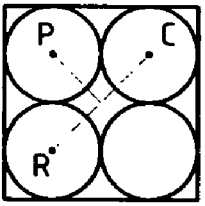
Figure 6:
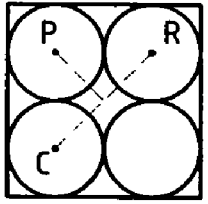

FIG. 6 is a comparison table showing Δα (the difference between the two angles of incidence for the two passages through the filter) and ΔIL (the difference between the insertion loss achieved and the optimal insertion loss at the transmission output) for the fiber arrangement according to the present invention as shown in FIG. 4 and other types of fiber arrangement as shown in FIG. 5(a) to 5(c). When the aperture 2112 has a vertical rectangular or triangular shape, as shown in FIG. 6, Δα is 3.67" and 1.34" respectively. Such a difference between the two angles of incidence would reduce the wavelength bandwidth for the lights emitting out the transmission output fiber 2123. On the other hand, since the line drawn between the transmission output fiber core P and reflection output fiber core R is not perpendicular to the line drawn between the point A and the ferrule center T for the vertical rectangular and triangular apertures, ΔIL is 0.25 dB and 0.10 dB respectively. If the aperture has a square shape but the fibers are arranged as shown in the third row of FIG. 6, which is different from what is provided by the present invention as shown in the fourth row of FIG. 6, $\Delta\alpha$ is zero as the common input fiber core C and the transmission output fiber core P have identical distances to the point O, which is the center point of the common input fiber core C and the reflection output fiber core R. However, the line drawn between the transmission output fiber core P and reflection output fiber core R is not perpendicular to the line drawn between the point A and the ferrule's center point T. When the reflection output is coupled to achieve the optimal, minimum insertion loss, the transmission output would have a 0.25 dB deviation from its achievable, minimum insertion loss. In other words, the transmission output and the reflection output cannot achieve optimal coupling in WDM 2 simultaneously. If the four fibers are arranged in a way according to the present invention as shown in the fourth row of FIG. 6, $\Delta\alpha$ and $\Delta IL$ are both zero. The fiber arrangement according to the present invention is indeed superior to other types of fiber arrangement.

If the four fibers are arranged as shown in FIG. 4 according to the present invention, the WDM 2 as depicted in FIG. 2 is assembled as follows. The lights in the input band I shoot into the WDM 2 through the common input fiber 2121. The filter 23, C-Lens 22, and the fiber pigtail 21 are adjusted until the lights in the reflection band J are coupled to the reflection output fiber 2122 and until the minimum insertion loss is reached. Then the filter 23, C-Lens 22, and the fiber pigtail 21 are adhered together using adhesive 213. The reflection mirror is then tilted at a specific angle $\alpha$ so that the lights in the transmission band K are coupled to the transmission output fiber 2123. The tilted angle $\alpha$ is between 0.5" and 4.0", depending on the fiber arrangement, the type of C-Lens, and the filter parameters. At this specific angle $\alpha$, the lights in the transmission band K are coupled to the transmission output fiber core P and have minimum insertion loss.

Figure 7:
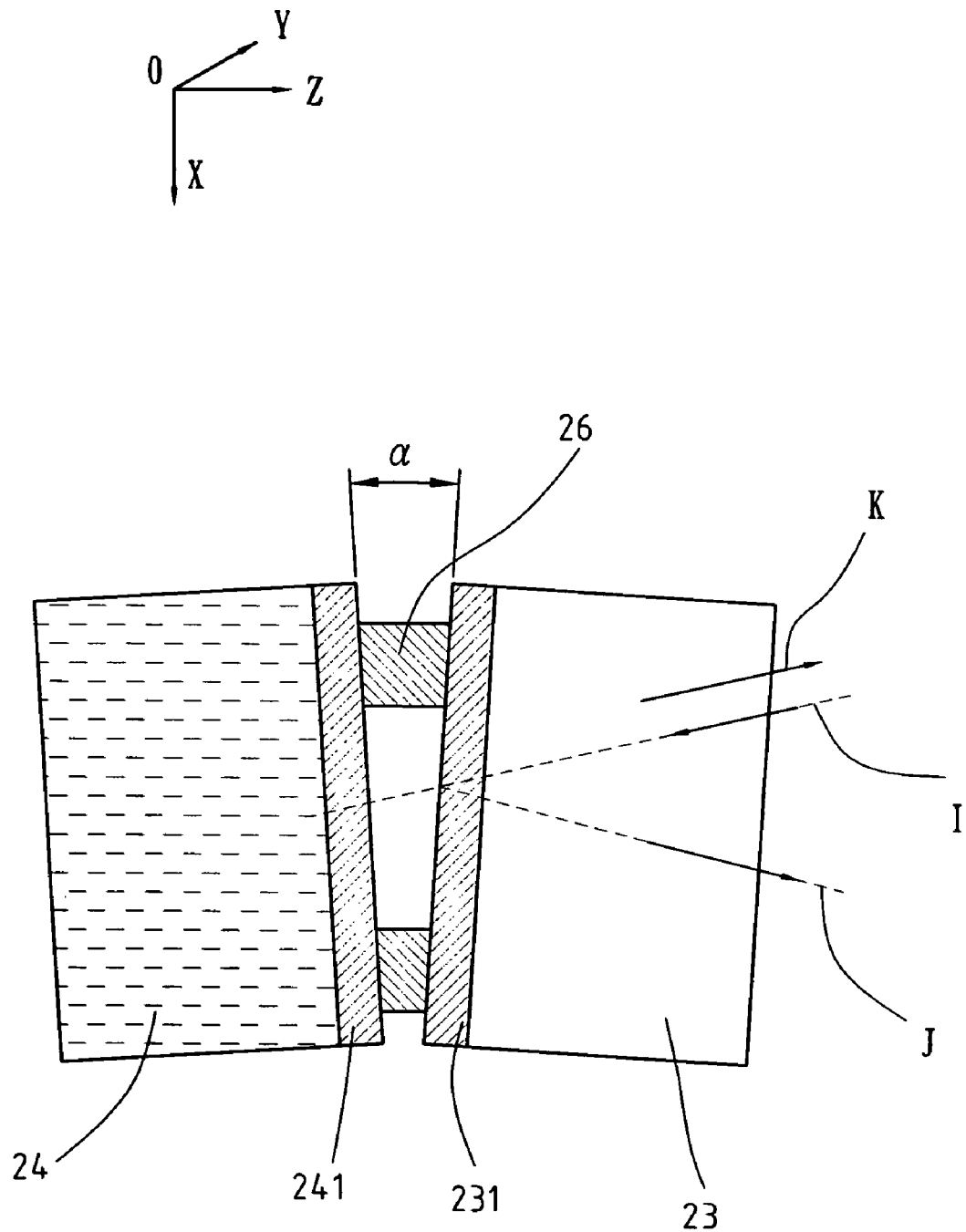
FIG. 7 shows the paths of lights traveling through the reflection-type WDM according to the present invention when viewed in the direction from −Y towards the origin of the coordinate system.
Figure 8:
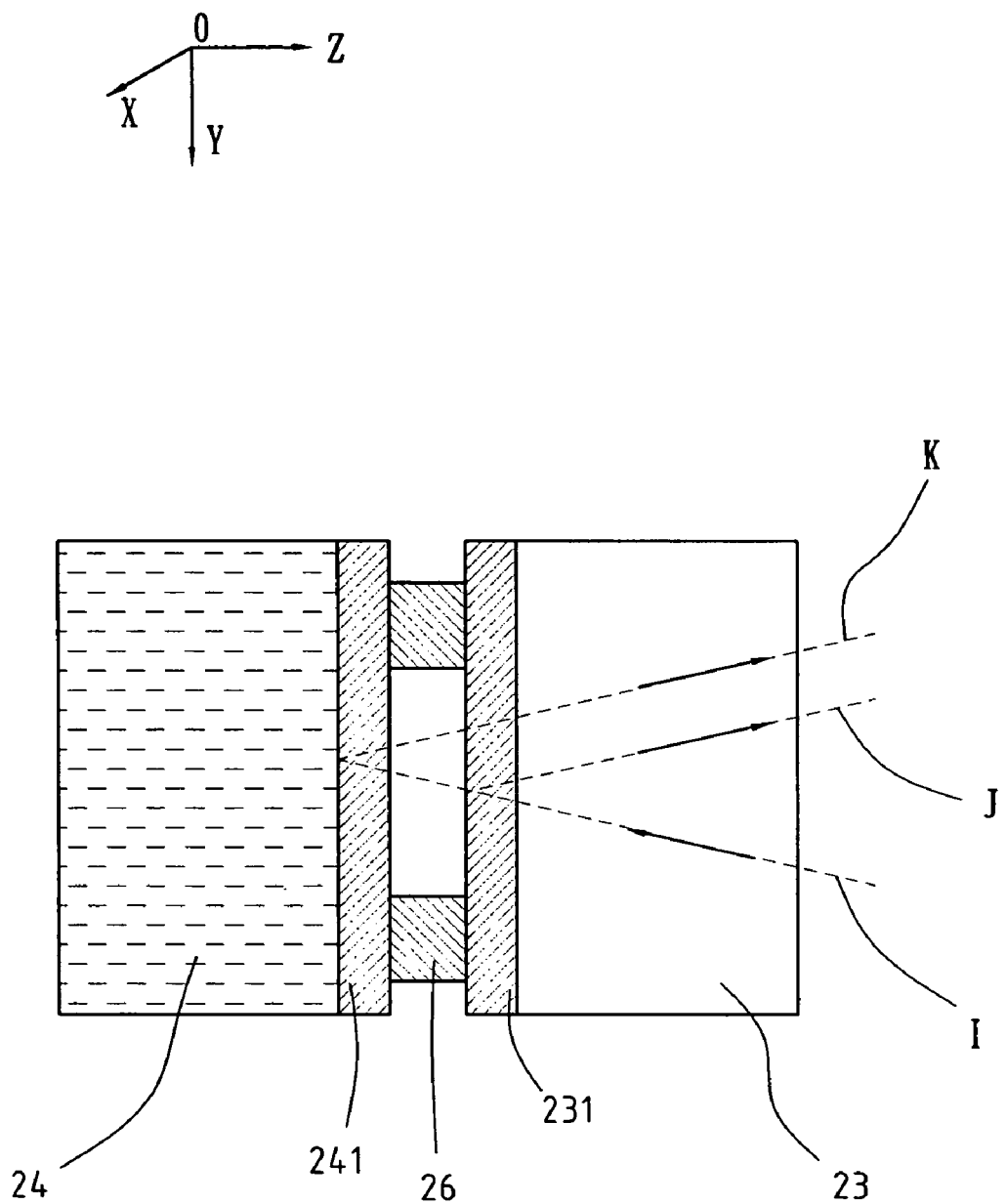
FIG. 8 shows the paths of lights traveling through the reflection-type WDM according to the present invention when viewed in the direction from +X towards the origin of the coordinate system.
Figure 9:
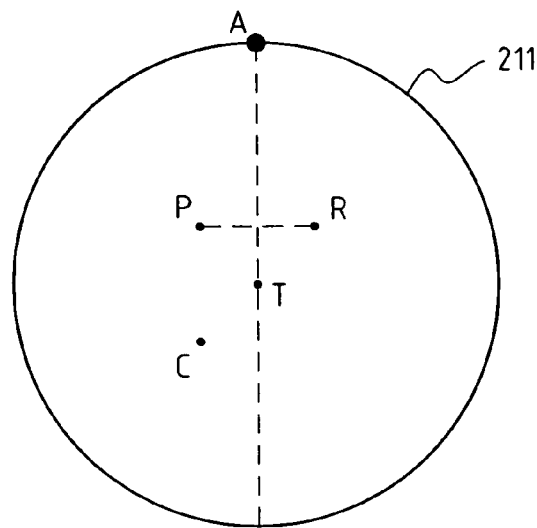
FIGS. 9(a) to 9(d) show four embodiments of the fiber arrangement according to the present invention.
Figure 9:
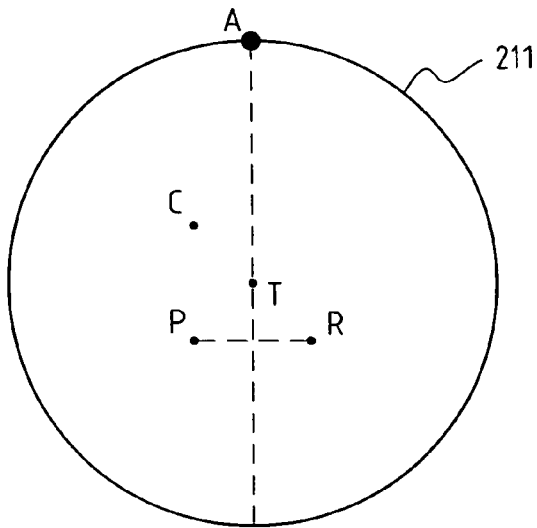
Figure 9:
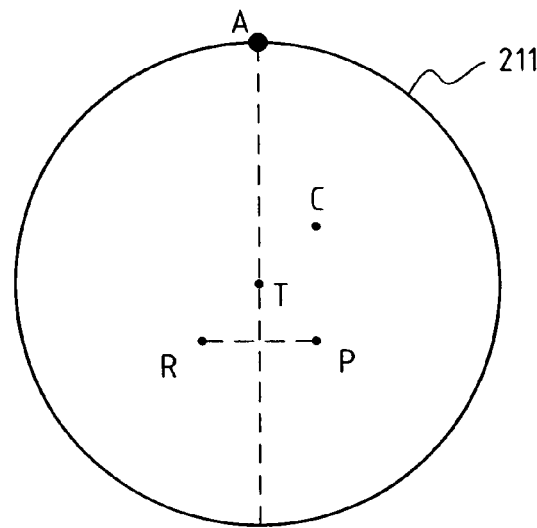
Figure 9:
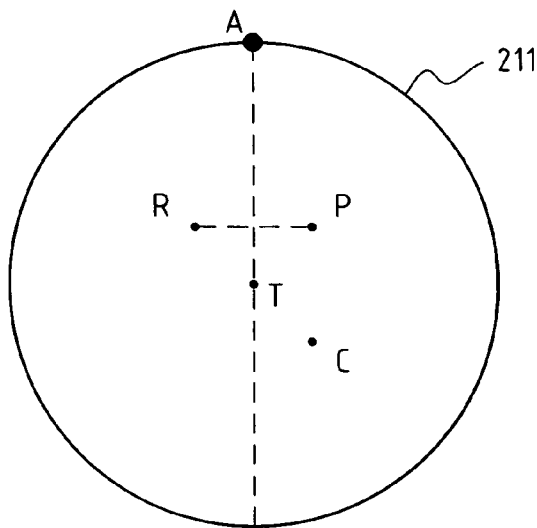

FIGS. 7 and 8 show the paths of lights traveling through the WDM according to the present invention when viewed from two different angles. As shown in FIGS. 7 and 8, when lights in the input band (such as $\lambda 1$, $\lambda 2$, $\lambda 3$) shoot into the filter 23, the lights in the transmission band K (such as $\lambda 1$) pass through the multi-layer dielectric interference coating 231 on the filter 23 for the first time and, after being reflected by the reflection coating 241 of the reflection mirror 24, pass through the multi-layer dielectric interference coating 231 on the filter 23 for the second time. On the other hand, the lights in the reflection band J (such as $\lambda 2$, $\lambda 3$) cannot pass through the multi-layer dielectric interference coating 231 on the filter 23 and is reflected by the multi-layer dielectric interference coating 231 directly.

What is depicted in FIG. 7 is viewed in the direction from $-Y$ towards the origin of the coordinate system. What is depicted in FIG. 8 is viewed in the direction from $+X$ towards the origin of the coordinate system. As shown in FIGS. 7 and 8, the tilted, cannular spacer 26 is a ring whose end surfaces have the angle $\alpha$ therebetween. The material for the tilted, cannular spacer 26 should have a thermal expansion coefficient as small as possible and can be in the range from $0 \times 10^{-6}/°$ C. to $25 \times 10^{-6}/°$ C., in order to minimize the impact of temperature variations to the WDM. If, instead of the tilted, cannular spacer 26, an usual adhesive having a large thermal expansion coefficient such as UV curing adhesive or epoxy resin is used to adhere the reflection mirror 24 and the filter 23, the performance of the WDM, especially the insertion loss, would be very sensitive to temperature variations. To overcome this limitation, the tilted, cannular spacer 26 having a small thermal expansion coefficient is therefore adopted in the present invention.

When the WDM is assembled, the beam waist is located between the multi-layer dielectric interference coating 231 of the filter 23 and the reflection coating 241 of the reflection mirror 24. When the beams of the light in the input band I shoot into the WDM through the common input fiber core C, which is located very close to the focus point of the C-Lens 22, the beams would be projected to the filter 23 and the reflection mirror 24 nearly in parallel after passing the C-Lens 22. If the beam waist is located on the multi-layer dielectric interference coating 231 of the filter 23, the reflection output would have the optimal insertion loss. On the other hand, if the beam waist is located on the reflection coating 241 of the reflection mirror 24, the transmission output would have the optimal insertion loss. However, since the beams nearly travel in parallel, the location deviation along the OZ axis of the multi-layer dielectric interference coating 231 or the reflection coating 241 would have very minor impact on the insertion loss of both the transmission output and the reflection output. In addition, since the tilted, cannular spacer 26 has a very small thermal expansion coefficient, the angle between the filter 23 and the reflection mirror 24 is insensitive to the temperature variation. The insertion loss of both the transmission output and the reflection output is therefore also not sensitive to the temperature variation.

FIGS. 9(a) to 9(d) show four embodiments of the fiber arrangement according to the present invention. In these drawings, the point A is the highest point of the ferrule 211's tilted, cross-sectional end surface 2111.

It should be noted that different types of fiber pigtails 21 can also be used in the WDM 2 of the present invention, as long as the aperture 2112 of the ferrule 211 has an appropriate shape and dimension to accommodate at least the common input fiber 2121, the reflection output fiber 2122, and the transmission output fiber 2123, and the fibers are arranged according to the principles of the present invention.

Figure 10:
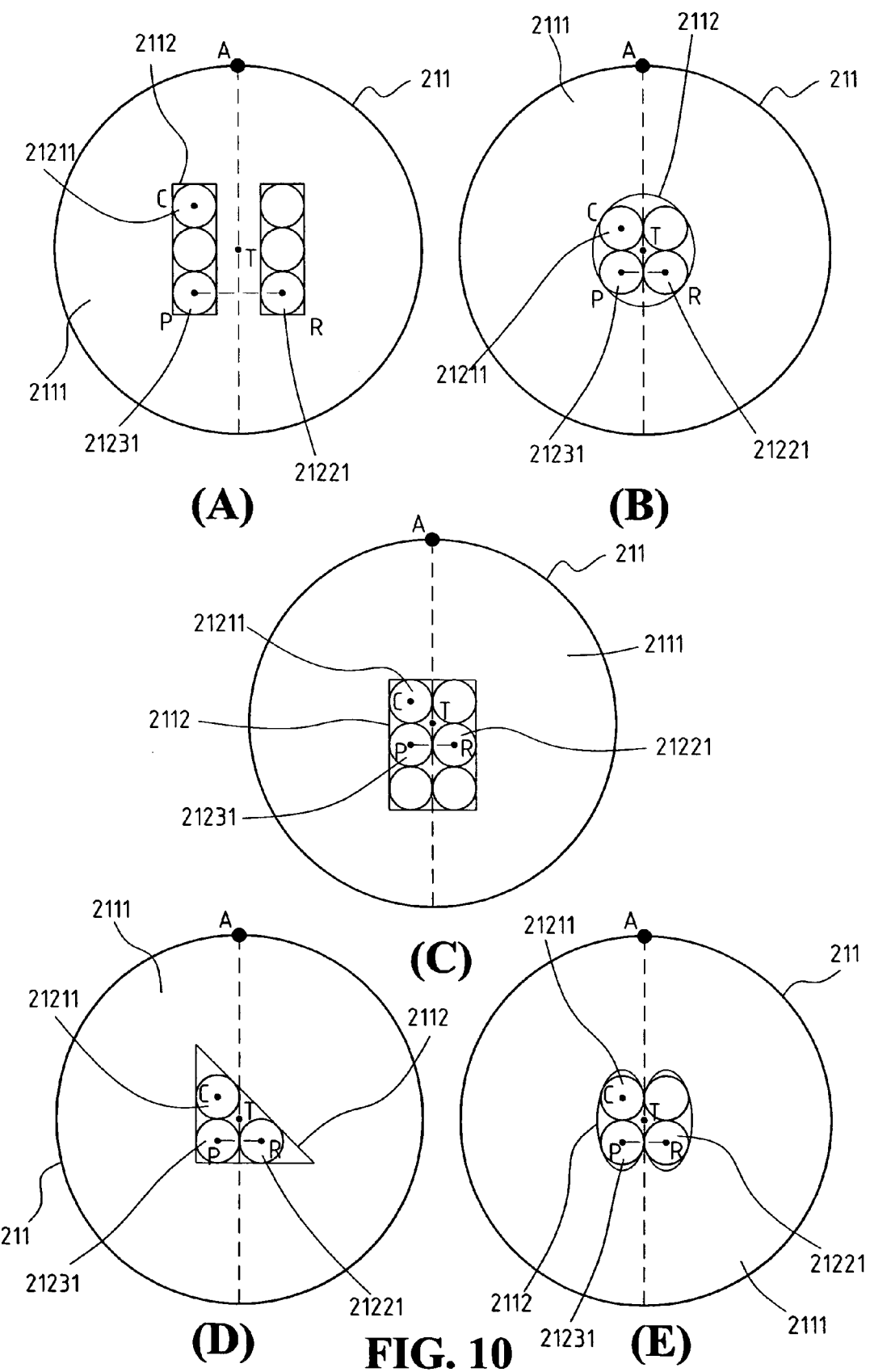
FIGS. 10(a) to 10(e) show five apertures with different shapes and dimensions and the arrangement of the common input fiber, the reflection output fiber, and the transmission output fiber in the apertures respectively according to the present invention.

FIGS. 10(a) to 10(e) show five apertures with different shapes and dimensions and the arrangement of the common input fiber 2121, the reflection output fiber 2122, and the transmission output fiber 2123 in the apertures respectively according to the present invention. As shown in FIG. 10(a), the aperture 2112 consists of two vertical rectangular holes. In FIG. 10(b), the aperture 2112 has an oval shape. The aperture 2112 in FIG. 10(c) has a vertical rectangular shape. In FIG. 10(d), the aperture is a right triangle. And in FIG. 10(e) the aperture 2112 consists of two oval holes.

As can be inferred from FIGS. 10(a) to 10(e), there could be many other possible aperture shapes and different types of fiber arrangements that conform to the requirements set forth by the present invention. These ferrules can also be used in the reflection-type WDM of the present invention and should be considered to be within the scope of the present invention.

In the foregoing discussion, detailed description has been given regarding how fibers should be arranged in the fiber pigtail 21, how lights in the input band I, the reflection band J, and the transmission band K travel inside the WDM 2, and how the use of the tilted, cannular spacer 26 improves the performance of the WDM 2.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wavelength division multiplexer comprising:
   a fiber pigtail further comprising a fiber bundle and a ferrule having a tilted, cross-sectional end surface;
   a lens;
   a cannular spacer interfacing with said tilted, cross-sectional end surface of said ferrule on one side and an end of said lens on the other side;
   a filter;
   a cap connecting the other end of said lens and an end of said filter;
   a reflection mirror; and
   a tilted, cannular spacer interfacing with the other end of said filter on one side and said reflection mirror on the other side;
   wherein said fiber bundle comprises at least a common input fiber, a reflection output fiber, and a transmission output fiber, all inserted and fixed in said ferrule and arranged in a way so that:
   a center point between said common input fiber core and said reflection output fiber core has identical distances to said common input fiber core and said transmission output fiber core; and
   a line drawn between said transmission output fiber core and said reflection output fiber core is perpendicular to a line drawn between a center point of said ferrule and a highest point of said ferrule's said tilted, cross-sectional end surface.

2. The wavelength division multiplexer according to claim 1, wherein said ferrule of said fiber pigtail has a central, square aperture capable of accommodating only four fibers.

3. The wavelength division multiplexer according to claim 1, wherein said ferrule of said fiber pigtail has a central aperture having a shape selected from the group consisting of circular, rectangular, oval, dual rectangular, dual oval, and triangular shapes, capable of accommodating at least three fibers.

4. The wavelength division multiplexer according to claim 1, wherein said lens is a cylindrical shaped convex lens.

5. The wavelength division multiplexer according to claim 1, wherein said lens is a aspheric lens.

6. The wavelength division multiplexer according to claim 1, wherein said reflection mirror is designed for lights whose wavelength is between 500 nm and 1,800 nm.

7. The wavelength division multiplexer according to claim 1, wherein said tilted, cannular spacer has a 0.5" to 4.0" angle between its two cross-sectional end surfaces.

8. The wavelength division multiplexer according to claim 1, wherein said tilted, cannular spacer has a thermal expansion coefficient between $0 \times 10^{-6}/°$ C. and $25 \times 10^{-6}/°$ C.

9. The wavelength division multiplexer according to claim 7, wherein said tilted, cannular spacer has a thermal expansion coefficient between $0 \times 10^{-6}/°$ C. and $25 \times 10^{-6}/°$ C.

10. A type of fiber arrangement in a fiber pigtail of a wavelength division multiplexer having at least a common input fiber, a reflection output fiber, and a transmission output fiber, all inserted and fixed in a ferrule having a tilted, cross-sectional end surface of said fiber pigtail in a way so that:
    a center point between a core of said common input fiber and a core of said reflection output fiber has identical distances to said core of said common input fiber and a core of said transmission output fiber; and
    a line drawn between said core of said transmission output fiber and said core of said reflection output fiber is perpendicular to a line drawn between a center point of said ferrule and a highest point of said ferrule's said tilted, cross-sectional end surface.

* * * * *